(12) United States Patent
Xu et al.

(10) Patent No.: US 11,008,496 B2
(45) Date of Patent: May 18, 2021

(54) COMPOSITION FOR PREPARING ANTI-WEAR LUBRICANT FOR DRILLING FLUID AND PREPARATION METHOD OF ANTI-WEAR LUBRICANT FOR DRILLING FLUID AND DRILLING FLUID

(71) Applicants: Yangtze University, Jingzhou (CN); Jingzhou Jiahua Technology Co., Ltd., Jingzhou (CN); CNPC Research Institute of Safety and Environmental Technology Co., Ltd., Beijing (CN)

(72) Inventors: Mingbiao Xu, Jingzhou (CN); Fuchang You, Jingzhou (CN); Xingchun Li, Beijing (CN); Jiao Wu, Jingzhou (CN); Shanshan Hou, Jingzhou (CN); Man Shu, Jingzhou (CN)

(73) Assignees: YANGTZE UNIVERSITY, Jingzhou (CN); JINGZHOU JIAHUA TECHNOLOGY CO., LTD., Jingzhou (CN); CNPC RESEARCH INSTITUTE OF SAFETY AND ENVIRONMENTAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/684,078

(22) Filed: Nov. 14, 2019

(65) Prior Publication Data

US 2020/0157401 A1 May 21, 2020

(30) Foreign Application Priority Data

Nov. 15, 2018 (CN) .......................... 201811359553.0

(51) Int. Cl.
*C09K 8/03* (2006.01)
*C09K 8/08* (2006.01)
*C09K 8/12* (2006.01)

(52) U.S. Cl.
CPC .................. *C09K 8/08* (2013.01); *C09K 8/12* (2013.01); *C09K 2208/10* (2013.01); *C09K 2208/34* (2013.01)

(58) Field of Classification Search
CPC ........ C09K 8/08; C09K 8/12; C09K 2208/10; C09K 2208/34; C09K 8/03; C09K 8/032; C09K 8/035; C09K 8/22; C09K 2208/28; C09K 2208/30; C09K 8/68; C09K 8/80; C09K 8/90; C09K 2208/00; C09K 2208/32; C09K 8/20; C09K 8/24; C09K 8/487; C09K 8/588; C09K 8/64; C09K 8/882; C09K 21/02; C09K 21/04; C09K 21/12; C09K 21/14; C09K 2208/18; C09K 8/5751; C09K 8/5758; C09K 8/685; C09K 8/805; C09K 8/88; E21B 43/26; E21B 33/13; E21B 43/16; E21B 7/00; E21B 43/267

See application file for complete search history.

(56) References Cited

U.S. PATENT DOCUMENTS

2003/0034477 A1* 2/2003 Minor .................. C10M 131/04
 252/68
2006/0122072 A1* 6/2006 Erdemir ............... C10M 169/04
 508/155

FOREIGN PATENT DOCUMENTS

CN 103571441 A 2/2014
CN 103865498 * 6/2014
CN 106398821 * 2/2015

OTHER PUBLICATIONS

Hao, L et al, Preparation and tribological properties of a kind of lubricant containing calcium borate nanoparticles as additives, Industrial Lubrication and Tribology, 2012, 64, 16-22.*

* cited by examiner

*Primary Examiner* — Kumar R Bhushan
(74) *Attorney, Agent, or Firm* — Volpe Koenig

(57) ABSTRACT

This pertains to the technical field of lubricants, and particularly relates to a composition for preparing a wear-resistant drilling fluid lubricant, a preparation method of the wear-resistant drilling fluid lubricant and a drilling fluid. Vegetable oil, nanometer calcium borate, an ether compound and an amine compound may be used as raw materials to prepare drilling fluid lubricant with excellent abrasion resistance by reasonably controlling dosages of the raw materials. The lubricant provided can improve wear resistance, lubricating property, and high temperature resistance of bentonite slurry and water-based drilling fluid.

12 Claims, 1 Drawing Sheet

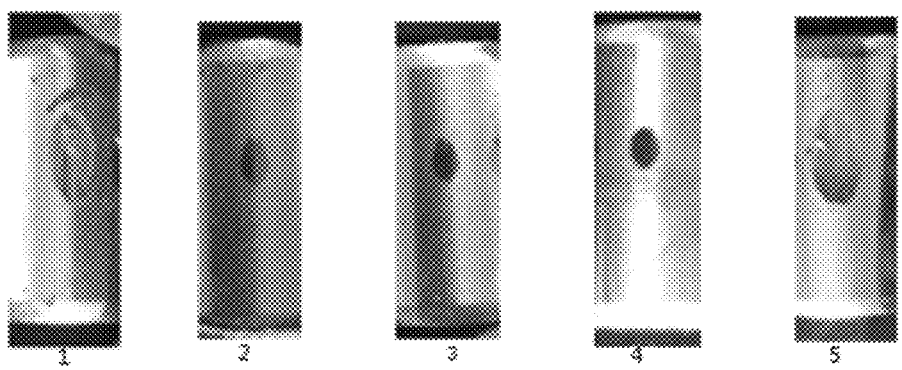

COMPOSITION FOR PREPARING ANTI-WEAR LUBRICANT FOR DRILLING FLUID AND PREPARATION METHOD OF ANTI-WEAR LUBRICANT FOR DRILLING FLUID AND DRILLING FLUID

CROSS REFERENCE

The application claims priority to Chinese Application No. 201811359553.0, filed on Nov. 15, 2018, entitled "Wear-resistant Drilling Fluid Lubricant and Preparation Method and Application Thereof", which is herein specifically and entirely incorporated by reference.

FIELD

The present invention pertains to the technical field of lubricants, and particularly relates to a composition for preparing a wear-resistant drilling fluid lubricant, a preparation method of the wear-resistant drilling fluid lubricant, and a drilling fluid.

BACKGROUND

The highly deviated wells, horizontal wells and ultra-deep wells have been increasingly widespread along with upgrading of the oil & gas drilling and production technology in China in recent years, however, the problems in regard to high friction resistance/torque, well trajector and drill column optimization design, annular space rock-carrying and borehole cleaning, borehole stability, well trajectory control and the like are increasingly prominent following the continuous enhancement of exploration and development of the extended reach wells, the horizontal wells, the deep wells and the ultra-deep wells. The friction resistance problem is the most outstanding problem in the drilling operation of the extended reach horizontal well, and the control degree of the friction resistance directly influences the extension length of the extended reach horizontal well. If the torque and the friction resistance are large in the drilling process, the abrasion of a drilling tool is prone to accelerate, the power consumption of drilling equipment is increased, the friction between a drill pipe and a casing is intensified, it even causes drilling safety accidents such as broken drilling rod, adhesion sticking, penetration and leakage of the casing due to friction of the drill pipe, as a result, the key point of the successful drilling of the extended reach horizontal well resides in reduction of the friction resistance and the torque.

Although the existing wear-resistant drilling fluid lubricant sold on the market produces a desirable extreme pressure lubrication effect, its friction resistance and torque reduction effects in practical application are unsatisfactory. For example, the Chinese invention patent CN103571441A provides a wear-resistant drag reducer for drilling fluid and preparation method thereof, a formula of the wear-resistant drag reducer is prepared from the following main raw materials: vegetable oil acid, cotton seed oil, sulfur powder, diethanol amine and kerosene; the auxiliary raw materials comprise tributyl phosphate, organic soil and T323 extreme pressure anti-wear reagent; the reduction rate of the wear loss of bentonite sample slurry may reach 64%-65%, the reduction rate of the wear loss of weighted sample slurry reaches 53%-58%, the wear-resistant effects are not ideal.

SUMMARY

A purpose of the present invention is to provide a composition for preparing a wear-resistant drilling fluid lubricant, a preparation method of the wear-resistant drilling fluid lubricant, and a drilling fluid. The lubricant prepared by the preparation method provided by the present invention exhibits its excellent wear-resistant effect, can improve the wear resistance performance of the bentonite slurry and the drilling fluid, has low biological toxicity and high biodegradability and produces desirable environmental protection effect.

In order to fulfill the above purpose, the present invention provides the following technical solution: the present invention provides a composition for preparing a wear-resistant drilling fluid lubricant, the composition comprising: 50-60 parts by mass of vegetable oil, 20-30 parts by mass of nanometer calcium borate, 5-10 parts by mass of ether compounds and 10-15 parts by mass of amine compounds.

Preferably, the vegetable oil comprises at least one of the group consisting of soybean oil, palm oil and tall oil.

Preferably, the nanometer calcium borate has a particle size of 20-200 nm.

Preferably, the ether compound includes at least one of the group consisting of ethylene glycol monobutyl ether, propylene glycol monobutyl ether, polypropylene glycol monobutyl ether, and polypropylene oxide.

Preferably, the amine compound includes at least one of the group consisting of triethanolamine oleate, diethylenetriamine, diethanolamine, oleic acid diethanolamide, linoleic acid diethanolamide and cocinic acid diethanolamide.

The present invention further provides a preparation method of the wear-resistant drilling fluid lubricant, which comprises the following steps:

(1) mixing vegetable oil and amine compounds to carry out an amidation reaction;

(2) blending the materials after the amidation reaction with nanometer calcium borate and an ether compound to perform substitution reaction to prepare the wear-resistant drilling fluid lubricant;

wherein the vegetable oil is used in an amount of 50-60 parts by mass, the nanometer calcium borate is used in an amount of 20-30 parts by mass, the ether compound is used in an amount of 5-10 parts by mass, and the amine compound is used in an amount of 10-15 parts by mass.

Preferably, the temperature of the amidation reaction is within a range of 160-180° C. and the reaction time is within a range of 3-4 hours.

Preferably, the temperature of blending the nanometer calcium borate, the ether compound and the material after the amidation reaction is within a range of 130-150° C.

Preferably, the temperature of the substitution reaction is within a range of 200-220° C., and the reaction time is within a range of 2-3 hours.

The invention further provides a drilling fluid comprising the wear-resistant drilling fluid lubricant prepared with the aforementioned preparation method.

The invention uses vegetable oil, nanometer calcium borate, an ether compound and an amine compound as raw materials and may prepare the drilling fluid lubricant with excellent abrasion resistance by reasonably controlling dosages of the raw materials. The results of the examples show that in the bentonite slurry when the added amount of the lubricant is 4.0 g/400 mL, the lubricant provided by the invention may have a reduction rate of the lubrication coefficient more than 97%, and the wear-resistant performance reaches 10 blocks of weights (800 g/block), the reduction rate of the adhesion lubrication coefficient of mud cakes is 80% or more, and the reduction rate of the wear loss is 97% or more; when the added amount of lubricant in a water-based drilling fluid system is 4.0 g/400 mL, the reduction rate of the lubrication coefficient is up to 94% or more, the wear-resistant performance reaches 10 blocks of weights; and the lubricant has a biological toxicity $LC_{50}$ more than 30000 mg/L and a biodegradability within a range of 40.97-70.42%, and the lubricant is environment-friendly.

BRIEF DESCRIPTION OF THE DRAWINGS

FIG. 1 is a diagram of material object showing wear-resistant tests in the examples 1-3, a blank example and a comparative example.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present invention provides a composition for preparing a wear-resistant drilling fluid lubricant, the composition comprises 50-60 parts by mass of vegetable oil, 20-30 parts by mass of nanometer calcium borate, 5-10 parts by mass of ether compounds and 10-15 parts by mass of amine compounds.

The composition for preparing the wear-resistant drilling fluid lubricant provided by the present invention comprises 50-60 parts, preferably 52-58 parts, and more preferably 54-57 parts by mass of vegetable oil. In the present invention, the vegetable oil preferably comprises at least one of the group consisting of soybean oil, palm oil and tall oil.

The composition for preparing the wear-resistant drilling fluid lubricant provided by the present invention comprises 20-30 parts, preferably 23-28 parts, and more preferably 24-27 parts by mass of nanometer calcium borate. In the invention, the particle size of the nanometer calcium borate is preferably 20-200 nm, more preferably 50-180 nm, and still more preferably 70-150 nm.

The composition for preparing the wear-resistant drilling fluid lubricant provided by the present invention comprises 5-10 parts, preferably 6-9 parts, and more preferably 7-8 parts by mass of ether compounds. In the present invention, the ether compound preferably includes at least one of the group consisting of ethylene glycol monobutyl ether, propylene glycol monobutyl ether, polypropylene glycol monobutyl ether, and polypropylene oxide, and more preferably at least one of ethylene glycol monobutyl ether, propylene glycol monobutyl ether and polypropylene oxide. In the examples of the present invention, the ether compound preferably includes ethylene glycol monobutyl ether; or a mixture of propylene glycol monobutyl ether and polypropylene oxide; or propylene glycol monobutyl ether. When the ether compound in the present invention is a mixture of several components, each component in the mixture is preferably used in an amount with equal mass ratio.

The composition for preparing the wear-resistant drilling fluid lubricant provided by the present invention comprises 10-15 parts, preferably 11-15 parts, and more preferably 12-15 parts by mass of amine compounds. In the present invention, the amine compound preferably comprises at least one of the group consisting of triethanolamine oleate, diethylenetriamine, diethanolamine, oleic acid diethanolamide, linoleic acid diethanolamide and cocinic acid diethanolamide, and more preferably at least one of diethanolamine, cocinic acid diethanolamide, triethanolamide oleate and oleic acid diethanolamide. In the examples of the present invention, the amine compound may be a mixture of diethanolamine and cocinic acid diethanolamide; or triethanolamine oleate; or a mixture of triethanolamine oleate and oleic acid diethanolamide. When the amine compound in the invention is a mixture of several components, each component in the mixture is preferably used in an amount with equal mass ratio.

The vegetable oil, the nanometer calcium borate, the ether compound and the amine compound are used with synergy in the present invention, wherein the vegetable oil has excellent lubricating property and is environment-friendly; the vegetable oil may perform amidation reaction with amine compounds to generate a compound with excellent wear-resistant and anti-friction performance and high temperature resistance; the ether compound can improve the film-forming property of the lubricant such that all components in the lubricant are uniformly coated on the surface of drilling equipment, thereby fulfilling the purposes of providing sufficient lubrication and protecting equipment; the nanometer sodium borate in the wear-resistant drilling fluid lubricant can serve as a nanometer wear-resistant factor, it may be adsorbed on the surfaces of the casing and the drill pipe under the action of organic components in the lubricant, and forms the rolling friction on the surfaces of the casing and the drill pipe, thus the lubricating property and the wear-resistant and drag-reduction performance of the lubricant are further enhanced.

The present invention further provides a preparation method of the wear-resistant drilling fluid lubricant, the preparation method comprises the following steps:

(1) mixing vegetable oil and amine compounds to carry out an amidation reaction;

(2) blending the materials after the amidation reaction with nanometer calcium borate and an ether compound to perform substitution reaction to prepare the wear-resistant drilling fluid lubricant;

wherein the vegetable oil is used in an amount of 50-60 parts by mass, the nanometer calcium borate is used in an amount of 20-30 parts by mass, the ether compound is used in an amount of 5-10 parts by mass, and the amine compound is used in an amount of 10-15 parts by mass.

The present invention relates to subjecting vegetable oil and amine compounds to an amidation reaction. In the present invention, the amidation reaction mode preferably includes mixing the vegetable oil and the amine compound, and raising the temperature to the temperature for the amidation reaction to perform the amidation reaction. In the invention, the temperature of the amidation reaction is preferably within a range of 160-180° C., more preferably 165-175° C., and further preferably 167-173° C.; the time of the amidation reaction is preferably within a range of 3-4 hours, and more preferably 3-3.5 hours. In the present invention, the process of mixing the vegetable oil and the amine compound, and the process of raising the temperature to the temperature of the amidation reaction are preferably performed under a stirring condition such that the components can be uniformly mixed and heated. The present invention does not impose a specific requirement on the concrete mode of stirring, only if it is well known among those skilled in the art.

In the amidation reaction process mentioned in the present invention, the vegetable oil reacts with amine compounds to generate organic compounds with wear-resistant and drag-reduction effects and high-temperature resistance, thereby improving the wear-resistant performance and the high-temperature resistance of the lubricant.

After the amidation reaction in the present invention, the materials after the amidation reaction are blended with nanometer calcium borate and an ether compound to perform substitution reaction to prepare the wear-resistant drilling fluid lubricant. Prior to the blending process, the materials after the amidation reaction are preferably cooled, and the final temperature of cooling is preferably within a range of 130-150° C., more preferably 135-145° C., and further preferably 140-145° C.; the cooling is preferably carried out in a manner well-known among those skilled in the art. In the present invention, the mixing mode is preferably to initially mix the ether and the nanometer calcium borate, and then blend the mixed materials with the materials after the amidation reaction. After the blending process, the temperature of the mixed materials in the present invention is preferably adjusted to the temperature required by the substitution reaction, wherein the temperature of the substitution reaction is preferably within a range of 200-220° C., and more preferably 205-215° C.; the time of the substitution reaction is preferably within a range of 2-3 hours, and more preferably 2-2.5 hours. The present invention preferably carries out the substitution reaction under the above-mentioned conditions, and can obtain products with clear and transparent appearance, and the yield of the obtained products is more than 80%.

After the substitution reaction, the present invention preferably carries out alcohol washing and impurities removing in regard to the materials after the substitution reaction to prepare the drilling fluid lubricant. In the present invention, the scrubbing solution for alcohol washing preferably includes methanol or ethanol. The present invention does not impose a specific requirement on the special embodiments of the alcohol wash, only if it can be practiced in a manner well known among those skilled in the art.

The present invention further provides a drilling fluid comprising the wear-resistant drilling fluid lubricant prepared with the aforementioned preparation method. Specifically, the drilling fluid of the present invention contains a water-based drilling fluid in addition to the wear-resistant drilling fluid lubricant. In the present invention, the water-based drilling fluid is a conventional component well known among those skilled in the art and the content will not be repeated herein.

In the present invention, the drilling fluid is preferably prepared by mixing the wear-resistant drilling fluid lubricant with a water-based drilling fluid.

In the present invention, the content of the wear-resistant drilling fluid lubricant is preferably 0.5-3 g, more preferably 0.7-2.5 g, and still more preferably 1.0-2.0 g relative to 100 mL of the water-based drilling fluid.

The present invention will be further described in detail with reference to the appended FIGURE and examples.

In the following examples and comparative example, the mentioned parts are denoted in parts by mass. In the following examples, the tall oil is commercially available from Guangzhou Nanjia Chemical Co., Ltd. in China; the palm oil is commercially available from Guangzhou Linan Chemical Co., Ltd., its melting point is 52° C.; the polypropylene oxide is commercially available from Guangzhou Runhong Chemical Co., Ltd. with the product name ppg 2000; the soybean oil is commercially available from Guangzhou Hongchang Biological Technology Co., Ltd.; the tall oil fatty acid is commercially available from Guangzhou Nanjia Chemical Co., Ltd.

EXAMPLE 1

Placing 15 parts by mass of amine compounds (a mixture of diethanolamine and cocinic acid diethanolamide in a mass ratio of 1:1) and 60 parts by mass of tall oil in a container, performing a constant temperature reaction under a condition of high temperature of 180° C. for 3 hours, cooling the reactants to 150° C., then adding it with 20 parts by mass of nanometer calcium borate (with a particle size of 200 nm) and 5 parts by mass of ethylene glycol monobutyl ether (wherein the nanometer calcium borate and the ethylene glycol monobutyl ether are uniformly stirred), reacting at a constant temperature of 220° C. in vacuum for 2 hours, cooling it to 80° C. and keeping the constant temperature of 80° C., subsequently washing it with 15 parts by mass of methanol, removing impurities through extraction; and cooling it to prepare the yellow liquid, which is exactly the wear-resistant drilling fluid lubricant.

EXAMPLE 2

Placing 10 parts by mass of amine compound (triethanolamine oleate) and 50 parts by mass of palm oil in a container, performing a constant temperature reaction under a condition of high temperature of 180° C. for 3 hours, cooling the reactants to 150° C., then adding it with 30 parts by mass of nanometer calcium borate (with a particle size of 100 nm) and 10 parts by mass of ether compound (a mixture of propylene glycol monobutyl ether and polypropylene oxide in the mass ratio of 1:1) which are uniformly stirred, reacting at a constant temperature of 220° C. in vacuum for 2 hours, cooling it to 80° C. and keeping the constant temperature of 80° C., subsequently washing it with 10 parts by mass of ethanol, removing impurities through extraction; and cooling it to prepare yellow liquid, which is exactly the wear-resistant drilling fluid lubricant.

EXAMPLE 3

Placing 15 parts by mass of amine compound (a mixture of triethanolamine oleate and oleic acid diethanolamide in a mass ratio of 1:1) and 55 parts by mass of soybean oil in a container, performing a constant temperature reaction under a condition of high temperature of 180° C. for 3 hours, cooling the reactants to 150° C., then adding it with 25 parts by mass of nanometer calcium borate (with a particle size of 20 nm) and 5 parts by mass of propylene glycol monobutyl ether (wherein the nanometer calcium borate and the propylene glycol monobutyl ether are uniformly stirred), reacting at a constant temperature of 220° C. in vacuum for 2 hours, cooling it to 80° C. and keeping the constant temperature of 80° C., subsequently washing it with 15 parts by mass of ethanol, removing impurities through extraction; and cooling it to prepare the yellow liquid, which is exactly the wear-resistant drilling fluid lubricant.

BLANK EXAMPLE

There isn't any lubricant added in the abrasion resistance test, the bentonite slurry performance test and the water-based drilling fluid test.

COMPARATIVE EXAMPLE 1

Tall oil fatty acid is used as a lubricant.
Application Performance Tests and Results
1. Comparison of the Abrasion Resistance Property The wear resistance of the wear-resistant drilling fluid lubricant prepared in the Examples 1-3 and the lubricant of the Comparative example 1 is evaluated by using a KMY201-1A wear resistance test instrument; a wear-resistant test is performed without adding any lubricant, and the test is used as a blank test for comparison. The mechanism of the abrasion resistance test is as follows: the drilling fluid subjects to mutual friction motion between the steel ball and the grinding wheel under a certain external force load, and under the condition of increasing loads (weights), the wear resistance performance of the lubricant is evaluated according to the maximum number of weights when the friction steel ball and the grinding wheel are locked and the oil film is finally broken. The test results are shown in FIG. 1 and Table 1, wherein FIG. 1 illustrates that the numeral 1 refers to the Blank example; the numerals 2-4 refer to the wear-resistant drilling fluid lubricants of Examples 1-3, respectively; and the numeral 5 refers to a lubricant of Comparative example 1.

TABLE 1

Performance test results of the wear-resistant lubricants

| Test sample | Blank example | Example 1 | Example 2 | Example 3 | Comparative example 1 |
|---|---|---|---|---|---|
| Blocks of wear-resistant weights (800 g/block) | 2 | 10 | 10 | 10 | 4 |
| Wear scar size of the steel balls | very large | very small | very small | very small | very large |
| Occurrence of heat generation | Yes | No | No | No | No |

Note:
the highest load borne by the abrasion resistance test instrument is 10 blocks of weights.

The test results in Table 1 show that the wear-resistant drilling fluid lubricant provided by the present invention has excellent wear-resistant performance as compared with the conventional lubricant, it does not generate heat in the wear-resistant test process, thus avoids adverse effects caused by frictional heat on the performance of the wear-resistant drilling fluid lubricant and the operation of drilling equipment; as illustrated from the material object diagram in FIG. 1, the wear scar obtained from an use of the wear-resistant drilling fluid lubricant provided by the present invention is relatively small, it indicates that the lubricant is conducive to reduced wear of the drilling equipment during the process of actual use.

2. Performance Comparison of Lubricants in Bentonite Slurries

The lubricating property of lubricants of Examples 1-3 and Comparative example 1 is measured according to the method specified in the standard Q/SY 1088-2012, the lubricating property is characterized by the reduction rate of lubrication coefficient.

The wear-resistant performance of the lubricants of Examples 1-3 and Comparative example 1 is tested according to the method specified in the tandard Q/SH 1170 060-2014, the wear-resistant performance is characterized by the reduction rate of the wear loss.

The present invention adopts the following bentonite slurry formula, which comprises the following steps:

Preparing 5 parts of base slurry: adding 400 mL of distilled water, 0.8 g of anhydrous sodium carbonate and 20 g of dry sodium bentonite into each part of the base slurry, stirring for 20 min at the rotating speed of 3000 r/min by using a high-speed blender, and then sealing and maintaining at ambient temperature for 24 h.

Taking three parts of base slurry, and adding it with 4.0 g of the test samples in the Examples 1-3, respectively; further taking 1 part of the base slurry, and adding it with 4.0 g of the test sample of the Comparative example 1, stirring it and another 1 part of the base slurry without adding any lubricant at 3000 r/min for 10 min, respectively, then carrying out aging under the conditions of the temperature of 180° C. for 16 h, cooling it to the ambient temperature, testing the reduction rate ($R_K$) of the extreme pressure lubrication coefficient of each sample, evaluating the wear-resistant performance of the samples by using a KMY201-1A wear-resistant test instrument, testing the reduction rate (W) of the adhesion coefficient of the mud cakes and the reduction rate (T) of the abrasion loss by using an NF-1 mud cake adhesion coefficient test instrument. The experimental results are shown in Table 2.

The reduction rate ($R_K$) of the lubrication coefficient is calculated according to the following formula (1):

$$R_K = \frac{K_0 - K_1}{K_0} \times 100\% \qquad (1)$$

wherein $R_K$ refers to the reduction rate of lubrication coefficient, %; $K_0$ refers to the lubrication coefficient of the Blank example; $K_1$ refers to the lubrication coefficient of the Blank example after addition of the lubricant.

The reduction rate (W) of the adhesion lubrication coefficient of the mud cakes is calculated according to the following formula (2):

$$W = \frac{W_0 - W_1}{W_0} \times 100\% \qquad (2)$$

wherein W refers to the reduction rate of the adhesion coefficient of the mud cakes, %;
$W_0$ refers to the adhesion torque of the mud cakes for the Blank example, N·m;
$W_1$ refers to the adhesion torque of the mud cakes for the Blank example after addition of the lubricant, N·m.

The reduction rate (T) of the abrasion loss is calculated according to the following formula (3):

$$T = \frac{(T_{01} - T_1) - (T_{02} - T_2)}{T_{01} - T_1} \times 100\% \qquad (3)$$

wherein, T refers to the reduction rate of the abrasion loss, %;
$T_{01}$ refers to the mass of grinding column of the Blank example before the experiment, g;
$T_1$ refers to the mass of grinding column of the Blank example after the experiment, g;
$T_{02}$ refers to the mass of grinding column of the Blank example with added lubricant before the experiment, g;

$T_2$ refers to the mass of grinding column of the Blank example with added lubricant after the experiment, g.

TABLE 2

Comparison of lubricant properties in Bentonite slurries

| Test samples | Reduction rate of the adhesion coefficient of the mud cakes (%) | Reduction rate of the lubrication coefficient (%) | Number of wear-resistant weight (block) | Reduction rate of the abrasion loss (%) |
|---|---|---|---|---|
| Blank example | — | — | 3 | — |
| Example 1 | 80 | 97.81 | 10 | 98.67 |
| Example 2 | 83 | 98.42 | 10 | 97.88 |
| Example 3 | 86 | 98.96 | 10 | 99.45 |
| Comparative example 1 | 32 | 73.51 | 7 | 45.45 |

The test results in Table 2 show that the wear-resistant drilling fluid lubricant provided by the present invention can improve the lubricating property and the wear resistance of bentonite slurry with greater force than the Blank example and the Comparative example, wherein the reduction rate of the adhesion coefficient of the mud cakes in the bentonite slurry system reaches 80% or more, the reduction rate of the lubrication coefficient is more than 97%, the number of wear-resistant weight (800 g/block) reaches 10 blocks, and the reduction rate of the abrasion loss is 97% or more.

3. Performance Comparison in Water-Based Drilling Fluid Systems

The present invention adopts the following drilling fluid system formula to evaluate the lubricants in the Examples 1-3 and the Comparative example 1, and the formula comprises the following steps:

preparing five parts of base slurry, each part is added with 400 g of seawater from south china sea, 8 g of shifted soil slurry, 0.6 g of sodium carbonate, 0.8 g of sodium hydroxide, 0.8 g of polyacrylamide, 0.8 g of polyanionic cellulose, 0.6 g of biopolymer, 4 g of lubricant, 8 g of asphalt resin, 10 g of anti-collapse and water-loss reduction agent, 4 g of film-forming agent and 20 g of potassium chloride; one part of the base slurry is used as a blank example without adding any lubricant, and the other four parts of the base slurry are respectively added with 4.0 g of the lubricants in the Examples 1-3 and Comparative example 1, the base slurries are subject to aging at a temperature of 180° C. for 16 h, and the reduction rate of the extreme pressure lubrication coefficient, the wear resistance, and the reduction rate of the adhesion coefficient of the mud cakes of the system are measured at an ambient temperature. The experimental results are shown in Table 3.

TABLE 3

Comparison of lubricant performances in water-based drilling fluid systems

| Test samples | Reduction rate of the lubrication coefficient (%) | Number of wear-resistant weight (blocks) | $FL_{API}$ (mL) |
|---|---|---|---|
| Blank example | — | 3 | 1.9 |
| Example 1 | 94.43 | 10 | 1.7 |
| Example 2 | 94.69 | 10 | 1.7 |
| Example 3 | 95.26 | 10 | 1.6 |
| Comparative example 1 | 73.51 | 7 | 2.0 |

Note:
$FL_{API}$: the water loss of drilling fluid under medium pressure (0.7 MPa, ambient temperature, 30 min), mL.

According to the test results in Table 3, when the lubricant provided by the present invention is used in water-based drilling fluid, the system subjects to aging for 16 h at a temperature of 180° C., the reduction rate of the lubrication coefficient and the number of wear-resistant weight of the obtained system are still at higher levels, which are obviously superior to the lubricant of Comparative example 1; the water loss amount of drilling fluid under medium pressure is relatively small, it demonstrates that the lubricant provided by the present invention does not influence the performance of the water-based drilling fluid, and it has the advantage of reduced filter loss.

4. Biotoxicity

The biotoxicity of lubricants is tested according to the method specified in the Chinese national standard GB/T18420.2-2009, the specific operations are as follows:

(1) preparing saline water with the salinity of 28.77 and the pH of 7 by using deionized water; culturing the same batch of 1 day-old artemia bred by a laboratory for later use;

(2) adding 40.00 g of lubricant sample into 1000 mL of saline water, stirring for 30 min at the rotating speed of 3000r/min, and keeping stand for 30 min after the stirring process, taking the middle layer of the solution as a storage solution. The concentration of the stock solution is 40000 mg/L.

(3) preparing 1 blank control group and 5 equal-ratio concentration groups according to the 96 h acute toxicity test solution preparation table of artemia in the standard, adding 100 mL of test solution into each container; and diluting the sample solution by using saline water, wherein the concentrations of the lubricant in the storage solutions of the equal-ratio concentration groups are 2500 mg/L, 5000 mg/L, 10000 mg/L, 20000 mg/L and 40000 mg/L respectively, and the concentration of the lubricant in the blank control group is 0 mg/L.

(4) randomly distributing 40 same batches of 1 day-old artemia in each test container, feeding the artemia with blue algae once per 24 hours, and recording the survival number of the artemia after 96 hours; calculating a regression equation of the death probability and the concentration logarithm according to the detection method in the standard, and finally obtaining the biological toxicity of the samples.

The biotoxicity of lubricant samples in the Examples 1-3 and the Comparative example 1 is tested according to the test method described above, and the results are shown in Table 4 below:

TABLE 4

Biotoxicity comparison of lubricant samples

| Lubricants | $LC_{50}$(mg/L) |
|---|---|
| Example 1 | 41805 |
| Example 2 | 38366 |
| Example 3 | 39280 |
| Comparative example 1 | 9730 |

As illustrated in Table 4, the half lethal concentration $LC_{50}$ of each lubricant provided by the present invention is greater than 30000 mg/L, it meets the environmental protection requirement and the performance is superior to the same kind of environmentally-friendly lubricants.

5. Biodegradability

The CODCr of the lubricant is measured according to the Chinese national standard GB11914-89 concerning the dichromate method for measuring Chemical Oxygen Demand (COD) of water, and the Biochemical Oxygen Demand for five days (BOD5) of the lubricant is measured according to a national standard GB7488-87 concerning the method for measuring BOD5 of water with the dilution and inoculation method, the biodegradability of the samples is determined based on the BOD5/CODCr ratio of a sample solution with a certain concentration, the higher is the ratio, the better is the biodegradability. The specific experimental operations are as follows:

preparing 4 water samples to be detected by respectively adding 2% of the lubricants in the Examples 1-3 and the Comparative example 1 into deionized water, and stirring at a low speed for 20 min for later use.

The COD test method: adding a known amount of potassium dichromate solution into each water sample to be detected, taking a silver salt as a catalyst under a strong acid medium, carrying out boiling reflux cooling, taking ferroin as an indicator, titrating unreduced potassium dichromate in water with ammonium ferrous sulfate, and calculating the Chemical Oxygen Demand based on the consumed amount of potassium dichromate.

BOD5 test method: inoculating microorganism into the water sample to be tested, and culturing it in a constant-temperature closed culture bottle for 5 days. During a process that the organic matters in a water sample are oxidized and decomposed by microorganisms to consume the dissolved oxygen in water, the released carbon dioxide is absorbed by a container which contains sodium hydroxide solid and is suspended in the culture bottle. Therefore, the air pressure in the bottle is reduced by an amount corresponding to the amount of dissolved oxygen consumed by the microorganisms. The change of pressure difference is detected by a sensor of an instrument, and the corresponding BOD5 is automatically calculated.

The COD and BOD5 measurements are carried out in regard to the Examples 1-3 and the Comparative example 1 according to the aforementioned scheme, and the detection results are shown in Table 5.

TABLE 5

Biodegradability comparison of lubricants in the Examples 1-3 and Comparative example 1.

| Samples | COD, mg/L | BOD5, mg/L | BOD5/COD, % |
|---|---|---|---|
| Example 1 | 11740 | 4980 | 42.41 |
| Example 2 | 10118 | 4590 | 45.36 |
| Example 3 | 12629 | 5130 | 40.62 |
| Comparative example 1 | 39788 | 5100 | 12.81 |

Table 5 shows that the biodegradability of the lubricants provided by the present invention is within a range of 40.62-45.36%, and the biodegradability is desirable.

The above examples demonstrate that the lubricants prepared with the raw materials vegetable oil, nanometer calcium borate, ether compound and amine compound exhibit desirable wear resistance, lubricating property, high temperature resistance and environmental protection performance, and can improve the comprehensive performance of the bentonite slurry and the water-based drilling fluid; the raw materials provided by the present invention for preparing lubricants have low cost and a few varieties, and are conducive for controlling cost of the drilling fluid lubricant.

In addition, the preparation method of the lubricant provided by the present invention is simple and easy to control, and is convenient for large-scale production.

The wear-resistant drilling fluid lubricant provided by the present invention has salt resistance and is not influenced by salt water, can be used for the water-based drilling fluid prepared by using fresh water and seawater, and does not affect performance of the water-based drilling fluid; the lubricant may resist the high temperature of 180° C.; it is low-foaming or foamless; it has a biotoxicity indicator $LC_{50}$ greater than 30000 mg/L and a biodegradability within a range of 40.62-45.36%, and it is environmentally friendly; the pure lubricant has excellent wear-resistant effect, only a small amount of wear scars is generated and less heat is released under the condition of placing 10 blocks of weights (800 g/block); when the added amount of the lubricant in the bentonite slurry is 4.0 g/400 mL, the lubricant may have a reduction rate of the lubrication coefficient more than 97%, and the wear-resistant performance reaches 10 blocks of weights, the reduction rate of the adhesion lubrication coefficient of mud cakes is 80% or more, and the reduction rate of the wear loss is 97% or more; when the added amount of lubricant in a water-based drilling fluid system is 4.0 g/400 mL, the reduction rate of the lubrication coefficient is up to 94% or more, the wear-resistant performance reaches 10 blocks of weights.

Compared with the properties of the existing lubricant, the wear-resistant lubricant provided by the present invention can not only reach the indicators of the existing congeneric products in the aspects of wear-resistance and lubricating performance, but also has smaller abrasion loss than the existing congeneric products.

The above content specifies the preferred embodiments of the present invention, but the present invention is not limited thereto. A variety of simple modifications can be made in regard to the technical solutions of the present invention within the scope of the technical concept of the present invention, including a combination of individual technical features in any other suitable manner, such simple modifications and combinations thereof shall also be regarded as the content disclosed by the present invention, each of them falls into the protection scope of the present invention.

The invention claimed is:

1. A composition for preparing a wear-resistant drilling fluid lubricant, the composition comprising: 52-58 parts by mass of vegetable oil, 23-28 parts by mass of nanometer calcium borate, 6-9 parts by mass of ether compounds and 11-15 parts by mass of amine compounds,
wherein the ether compounds comprise at least one selected from the group consisting of ethylene glycol monobutyl ether, propylene glycol monobutyl ether, polypropylene glycol monobutyl ether, polymethylene oxide and polypropyleneoxide.

2. The composition according to claim 1, wherein the vegetable oil comprises at least one selected from the group consisting of soybean oil, palm oil and tall oil.

3. The composition according to claim 1, wherein the nanometer calcium borate has a particle size of 20-200 nm.

4. The composition according to claim 1, wherein the amine compounds comprises at least one selected from the group consisting of triethanolamine oleate, diethylenetriamine, diethanolamine, oleic acid diethanolamide, linoleic acid diethanolamide and cocinic acid diethanolamide.

5. A preparation method of the wear-resistant drilling fluid lubricant of claim 1, the method comprising the following steps:
(1) mixing the vegetable oil and the amine compounds to carry out an amidation reaction; and
(2) blending the materials after the amidation reaction with the nanometer calcium borate and the ether compounds to perform substitution reaction to prepare the wear-resistant drilling fluid lubricant.

6. The preparation method according to claim 5, wherein the temperature of the amidation reaction is within a range of 160-180° C. and the reaction time is within a range of 3-4 hours.

7. The preparation method according to claim 5, wherein the temperature of blending the nanometer calcium borate and the ether compound with the material after the amidation reaction is within a range of 130-150° C.

8. The preparation method according to claim 5, wherein the temperature of the substitution reaction is within a range of 200-220° C., and the reaction time is within a range of 2-3 hours.

9. The preparation method according to claim 5, wherein the vegetable oil comprises at least one selected from the group consisting of soybean oil, palm oil and tall oil;
the ether compounds comprises at least one selected from the group consisting of ethylene glycol monobutyl ether, propylene glycol monobutyl ether, polypropylene glycol monobutyl ether and polypropylene oxide;
the amine compounds comprises at least one selected from the group consisting of triethanolamine oleate, diethylenetriamine, diethanolamine, oleic acid diethanolamide, linoleic acid diethanolamide and cocinic acid diethanolamide.

10. The preparation method according to claim 5, wherein the nanometer calcium borate has a particle size of 20-200 nm.

11. A drilling fluid comprising the wear-resistant drilling fluid lubricant prepared with the preparation method according to claim 5.

12. The drilling fluid according to claim 11, wherein the drilling fluid further comprising a water-based drilling fluid, the content of the wear-resistant drilling fluid lubricant is 0.5-3 g relative to 100 mL of the water-based drilling fluid.

* * * * *